United States Patent [19]
Miller et al.

[11] Patent Number: 6,137,779
[45] Date of Patent: Oct. 24, 2000

[54] TRANSMISSION RATE CALCULATION SCHEME USING TABLE-LOOKUP

[75] Inventors: Michael J. Miller, Saratoga; Vladan Djakovic, San Jose; Bilal Murtaza, Newark, all of Calif.

[73] Assignee: Integrated Device Technology, Inc., Santa Clara, Calif.

[21] Appl. No.: 08/862,152

[22] Filed: May 22, 1997

[51] Int. Cl.[7] .............................. G01R 31/08; H04J 1/16; H04J 3/22; H04L 12/26

[52] U.S. Cl. .......................... 370/236; 370/232; 370/468

[58] Field of Search ................................... 370/230, 231, 370/232, 233, 234, 235, 236, 237, 389, 395, 397, 412, 468

[56] References Cited

U.S. PATENT DOCUMENTS

| | | | |
|---|---|---|---|
| 5,506,844 | 4/1996 | Rao | 370/468 |
| 5,850,398 | 12/1998 | King, Jr. | 370/412 |
| 5,936,940 | 7/1999 | Marin et al. | 370/232 |

*Primary Examiner*—Huy D. Vu
*Assistant Examiner*—Kevin C. Harper
*Attorney, Agent, or Firm*—Skjerven Morrill MacPherson Franklin & Friel

[57] ABSTRACT

A method for distributing the available bit rates in a variable bit rate service under asynchronous transfer mode is provided by distributing the available bit rates in logarithmic-linear steps, so that the ratio between two successive available bit rates are substantially constant. To minimize computation required to calculate the next available allowable cell rate, a table look-up method can be used in conjunction with a state machine. In one embodiment, the table look-up operation includes accessing a rate increase table and a rate decrease table. A selection circuit is provided to choose the next allowable cell rate from the current cell rate, and the output values obtained from looking up the rate increase table and the rate decrease table.

16 Claims, 5 Drawing Sheets

| INTERVAL | KILOBITS/ SECOND | CELLS/ SECOND |
|---|---|---|
| 1.0000 | 155,000.00 | 365,566.04 |
| 1.0417 | 148,795.24 | 350,932.17 |
| 1.0851 | 142,838.86 | 336,884.10 |
| 1.1304 | 137,120.92 | 323,398.39 |
| 1.1775 | 131,631.87 | 310,452.52 |
| 1.2266 | 126,362.55 | 298,024.88 |
| 1.2778 | 121,304.17 | 286,094.73 |
| 1.3311 | 116,448.27 | 274,642.15 |
| 1.3866 | 111,786.76 | 263,648.03 |
| 1.4444 | 107,311.86 | 253,094.01 |
| 1.5046 | 103,016.09 | 242,962.47 |
| 1.5674 | 98,892.28 | 233,236.51 |
| 1.6327 | 94,933.55 | 223,899.89 |
| 1.7008 | 91,133.29 | 214,937.01 |
| 1.7717 | 87,485.16 | 206,332.93 |
| 1.8456 | 83,983.07 | 198,073.27 |
| 1.9226 | 80,621.17 | 190,144.26 |
| 2.0027 | 77,393.84 | 182,532.65 |
| 2.0863 | 74,295.71 | 175,225.73 |
| 2.1733 | 71,321.60 | 168,211.32 |
| 2.2639 | 68,466.55 | 161,477.70 |
| 2.3583 | 65,725.78 | 155,013.63 |
| 2.4566 | 63,094.73 | 148,808.33 |
| 2.5591 | 60,569.00 | 142,851.42 |
| 2.6658 | 58,144.38 | 137,132.98 |
| 2.7769 | 55,816.82 | 131,643.44 |
| 2.8927 | 53,582.43 | 126,373.66 |
| 3.0134 | 51,437.49 | 121,314.83 |
| 3.1390 | 49,378.41 | 116,458.51 |
| 3.2699 | 47,401.76 | 111,796.60 |
| 3.4063 | 45,504.23 | 107,321.30 |
| 3.5483 | 43,682.66 | 103,025.15 |
| 3.6963 | 41,934.01 | 98,900.98 |
| 3.8504 | 40,255.37 | 94,941.90 |
| 4.0110 | 38,643.91 | 91,141.31 |
| ...... | .......... | ...... |
| ...... | .... | ...... |
| 956.6819 | 162.02 | 382.12 |
| 996.5756 | 155.53 | 366.82 |
| 1,038.1328 | 149.31 | 352.14 |
| 1,081.4229 | 143.33 | 388.04 |
| 1,126.5183 | 137.59 | 324.51 |
| 1,173.4941 | 132.08 | 311.52 |
| ... | ... | ... |
| .... | ....... | .... |
| 2,350.2074 | 65.95 | 155.55 |
| 2,448.2111 | 63.31 | 149.32 |
| 2,550.3015 | 60.78 | 143.34 |
| 2,656.6490 | 58.34 | 137.60 |
| 2,767.4313 | 56.01 | 132.10 |
| 2,882.8332 | 53.77 | 126.81 |
| 3,003.0473 | 51.61 | 121.73 |
| ....... | .... | ...... |
| ...... | ....... | .... |
| 27,268.8009 | 5.68 | 13.41 |
| 28,405.9099 | 5.46 | 12.87 |
| 29,590.4363 | 5.24 | 12.35 |
| 30,824.3575 | 5.03 | 11.86 |
| 32,109.7332 | 4.83 | 11.38 |
| 33,448.7091 | 4.63 | 10.93 |

FIG. 5

TRANSMISSION RATE CALCULATION SCHEME USING TABLE-LOOKUP

BACKGROUND OF THE INVENTION

1. Field of the Invention

This invention relates to flow control in a packetized data network. In particular, the present invention relates to the calculation of cell transmission rates in an Asynchronous Transfer Mode (ATM) based data network.

2. Description of the Related Art

Data communication under ATM is set forth in a standard entitled "The ATM Forum Specification, version 4.0" (the "ATM standard"). Under the ATM standard, data exchange between a source system and a destination system is accomplished using one or more packetized data streams ("virtual channels"). Data and control information in each virtual channel are transported by 53-byte data packets or cells ("ATM cells"). In general, under the ATM standard, a virtual channel is set up by a virtual circuit connection under a fixed or constant bit rate service (CBR), or a variable bit rate service (VBR). In fact, under the ATM standard, many CBR and VBR virtual circuits can coexist between a given pair of source and destination systems. In one type of VBR service, known as the "available bandwidth rate service" ("ABR service"), the source and destination systems periodically negotiate for each virtual channel a bit rate according to the traffic conditions in all switches along the path of the virtual channel's virtual circuit.

In an ABR virtual circuit, the virtual circuit, the source and destination systems, and all the switches in between, negotiate a "peak cell rate" (PCR), a "minimum cell rate" (MCR), and an "initial cell rate" (ICR). During the life of the virtual circuit, resource management (RM) cells are sent periodically by the source system. Initially, the ATM cells for the virtual channel are sent at the ICR until the first RM cell is sent by the source. Included in the RM cell is an "explicit rate" (ER) field and a "direction" (DIR) field, which are initialized by the source system to the PCR and the value "forward" respectively. Because of the "forward" value in the DIR field, this RM cell is referred to as the "forward RM" (FRM) cell. As the FRM cell traverses the virtual circuit towards the destination system, each switch along the virtual circuit examines the ER field of the FRM cell and, where appropriate, reduces the cell rate specified in that field to indicate the available bandwidth the switch can provide, given its own local traffic condition. If a congestion condition is experienced at the switch, i.e. the instantaneous or immediate rate at which ATM cells are arriving exceeds the rate at which these ATM cells can be processed and forwarded by the switch, a "congestion" field (CI) of the FRM cell is marked. When the FRM cell reaches the destination system, the destination system (i) makes its own adjustment to the ER field, if necessary, (ii) marks the DIR field of the RM cell to indicate that the RM cell is now a "backward" RM (BRM) cell, and (iii) returns the BRM cell to the source system in the reverse direction on the virtual circuit. When the BRM cell reaches the source system, the value in the ER field is examined against the current cell rate. The current cell rate, which is also known as the "allowable cell rate" (ACR), is increased or decreased according to the value in the ER field of the BRM cell returned.

In some applications, e.g. an ATM server, it is necessary to support a very large number of virtual channels (e.g. a 1000 channels) of various fixed and variable bit rates over a given ATM physical media. In such an application, a scheduler coordinates the shared use of the physical media among the large number of virtual channels, so that the use of the physical bandwidth of the physical media can be maximized. In addition, many schedulers provide a "fairness" scheme so that sharing of the available bandwidth among the multiple variable rate virtual channels can be carried out in a predictable manner, and each variable rate virtual channel is given some opportunity to meet its desired cell rate.

One class of fairness schemes is known as the "min-max" fairness schemes. Under a min-max fairness scheme, a system divides the virtual channels into two classes according to their respective cell rates relative to the average cell rater $$\left(\text{i.e. } \frac{\text{available bandwidth}}{\text{number of } VBR \text{ virtual channels}}\right)$$

of the system. In the first class, i.e. those virtual channels having desired cell rates at or below the average cell rate, these virtual channels are provided the desired cell rate. In the second class, i.e. those virtual channels having desired cell rates above the average cell rate, these virtual channels share the remaining bandwidth. Within the second class, the bandwidth can be shared among the virtual channels equally ("unweighted"), or according to some assigned priorities ("weighted"). To ensure robustness under a min-max fairness scheme, the elements in the virtual circuits servicing the virtual channels must be capable of rapid response. Otherwise, data loss may result. For example, consider the case when one congested virtual circuit decreases its cell rate abruptly, thereby relieving the congestion condition at a previously congested element within the virtual circuit. In response to the bandwidth now available at the previous congested element, several virtual circuits may attempt to increase their respective cell rates at the same time. If the readjustment in cell rates in these virtual circuits do not occur rapidly enough, congestion conditions may then reappear at other elements of the network rapidly. Such congestion conditions, if not corrected rapidly, may lead to data loss.

SUMMARY OF THE INVENTION

The present invention provide both a circuit and a method for adjusting allowable cell rates (ACRs) under the ATM standard in logarithmic steps. That is, in accordance with the present invention, each allowable cell rate used in any virtual connection can be increased or decreased to the next allowable cell rate by a substantially constant percentage of the current allowable cell rate, over the entire range of allowable cell rates. Under this scheme, a "cell rate density" problem in the prior art, in which the number of available allowable cell rates at the higher transmission rates is small relative to the number of available allowable cell rates at the lower transmission rates, is overcome.

One embodiment of the present invention is implemented in a segmentation and reassembly (SAR) integrated circuit which complies with the aynchronous transfer mode (ATM) standard. In that embodiment, the circuit of the present invention is used for calculating the next allowable cell rate for a variable bit rate service. In that embodiment, a circuit is provided in which the next allowable cell rate is selected from an ordered list of available allowable cell rates in accordance with the current allowable cell rate. In this ordered list, the ratio between two successive elements of the ordered list is substantially constant.

In one embodiment, the circuit of the present invention receives control signals indicating whether the next allowable cell rate is to be (i) greater than the current allowable cell rate, (ii) the same as the current allowable cell rate, or (iii) less than the current allowable cell rate. In that embodiment, the circuit of the present invention includes a storage element containing a data structure indexed by the current allowable cell rate. The storage element outputs a first output value greater than the current allowable cell rate, and a second output value less than the current allowable cell rate. A selection circuit, which receives the control signals, then selects the next cell rate from the first and second output values and the current cell rate, in accordance with the control signals. The circuit in this embodiment can be simply implemented using a state machine and multiplexers and hence avoids computationally expensive steps. Consequently, the present invention allows real time scheduling of a large number of virtual channels. The present invention is particularly convenient for use with a calendar type scheduler. The table look-up method is particularly efficient when the number of available allowable cell rates is an integer power of 2.

In one embodiment, a selection circuit is provided for limiting the next allowable cell rate to between a maximum transmission rate and a minimum transmission rate. Typically, the maximum transmission rate is provided by the periodically negotiated "explicit rate" (ER) of a virtual connection. The ER is also typically limited by a peak cell rate (PCR) which is negotiated at the set-up time of the virtual connection.

The present invention is better understood upon consideration of the detailed description below and the accompanying drawings.

BRIEF DESCRIPTION OF THE DRAWINGS

FIG. 5 shows in Table 1 an example of the available data rates that can be specified in an ACR rate table in the embodiment of FIG. 4.

DETAILED DESCRIPTION OF THE PREFERRED EMBODIMENTS

Figure 1:
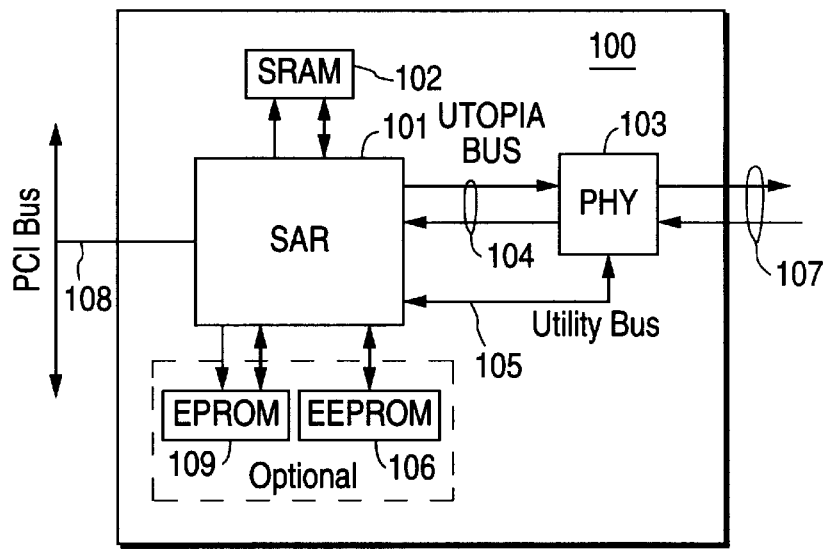
FIG. 1 shows a network interface system 100, including a segmentation and reassembly integrated circuit (SAR) 101, in which the present invention can be implemented.

The present invention can be implemented in a communication system using the ATM protocols. In particular, the present invention can be implemented in a rate calculation circuit of a segmentation and reassembly (SAR) integrated circuit. One implementation of this SAR integrated circuit supports both fixed rate and variable rate virtual channels. Such a SAR integrated circuit is shown in FIG. 1 which shows a network interface system 100 within which the present invention can be implemented. System hinterface system 100 interfaces with a host computer (not shown) over an industry standard PCI bus 108, and interfaces with an ATM network 107 over through a framer and physical media (PHY) device 103. System 100 includes SAR integrated circuit 101 ("SAR 101") which receives data from both the host computer and ATM network 107. SAR 101 segments the data received from the host computer into ATM cells, which are typically received in data packets ("protocol data units") in accordance with an established higher level protocol. The segmented ATM cells are provided over an industry standard UTOPIA bus 104 to PHY device 103 for transmission into ATM network 107. At the same time, SAR 101 receives ATM cells from PHY device 103, which are then reassembled by SAR 101 into the data packets of the higher level protocol for transmission to the host computer over PCI bus 108. An example of such a higher level protocol is the convergence sublayer (CS) protocol. In performing the segmentation and reassembly operations, SAR 101 uses static random access memory (SRAM) for storing such data structures as connection tables, buffer queues, segmentation channels, and scheduling tables. In addition, non-volatile memory, such as EPROM[1] 109 or EEPROM[2] 106 shown in FIG. 1, can also be provided to store the driver software necessary to drive the operations of SAR 101.

Figure 2:
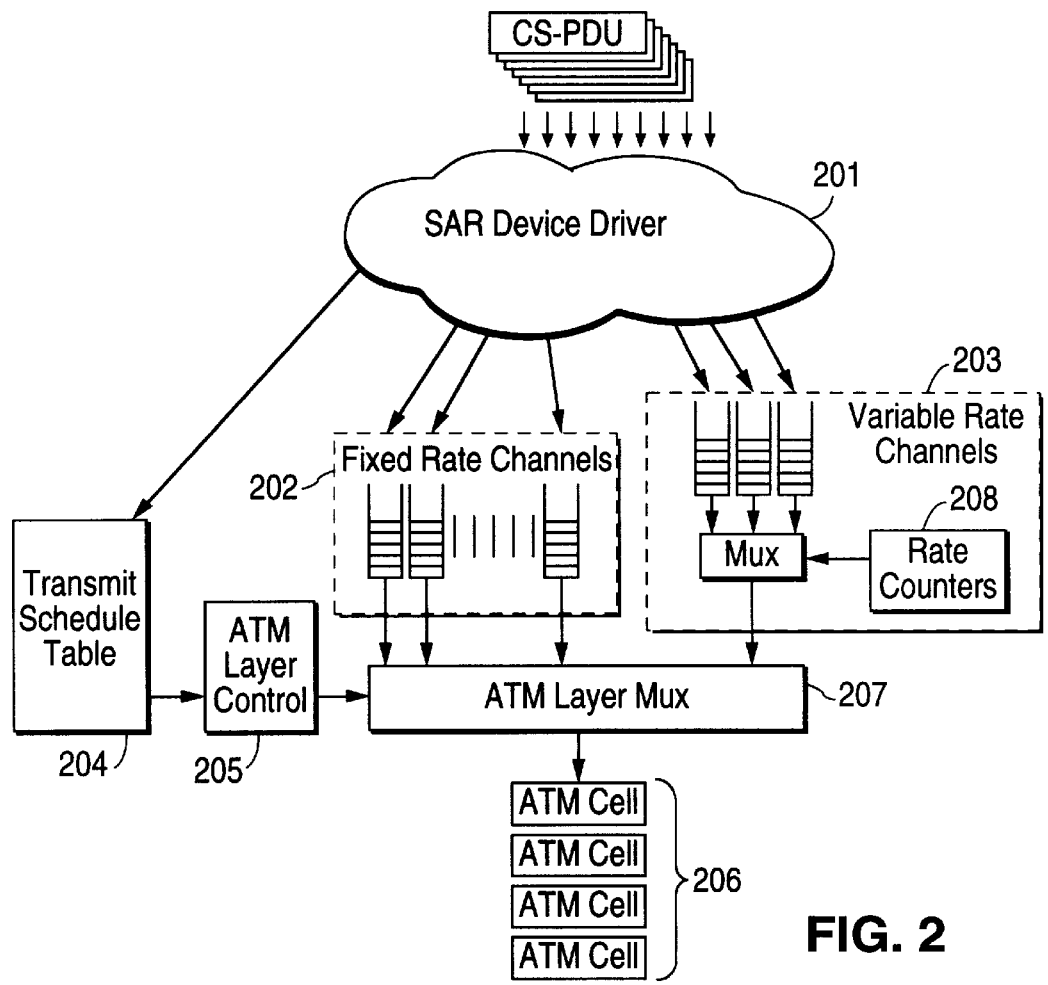
FIG. 2 illustrates schematically the transmission operations of SAR 101 in an embodiment of the present invention.

[1] Electrically Programmable Read-Only Memory
[2] Electrically Erasable and Programmable Read-Only Memory The transmission operations of SAR 101 is illustrated schematically in FIG. 2. As shown in FIG. 2, SAR 101 receives data from the host computer over PCI bus 108 in CS protocol data unit (CS-PDU) data packets. The operations of SAR 101 is globally controlled by a SAR device driver 201. The CS-PDU data packets are segmented into ATM cells and queued for transmission in their respective virtual channels. To emphasize that SAR 101 typically supports both fixed rate (i.e. CBR) services and variable rate (i.e. VBR or ABR) services, fixed rate virtual channels are illustrated separately as CBR channels 202, and variable rate virtual channels are illustrated as VBR/ABR channels 203 respectively. The physical bandwidth of SAR 101 is shared amongst CBR and VBR/ABR channels 202 and 203 according to the transmission schedule implemented in transmission schedule tables 204. A state machine, represented in FIG. 2 by ATM layer control module 205, controls multiplexing SAR 101's ATM cell transmission time slots 206 among CBR channels 202 and VBR/ABR channels 203. FIG. 2 shows, in particular, that the present embodiment further controls transmission of ATM cells in VBR/ABR channels 203 by including a rate control mechanism represented by rate counters 208.

Figure 3:
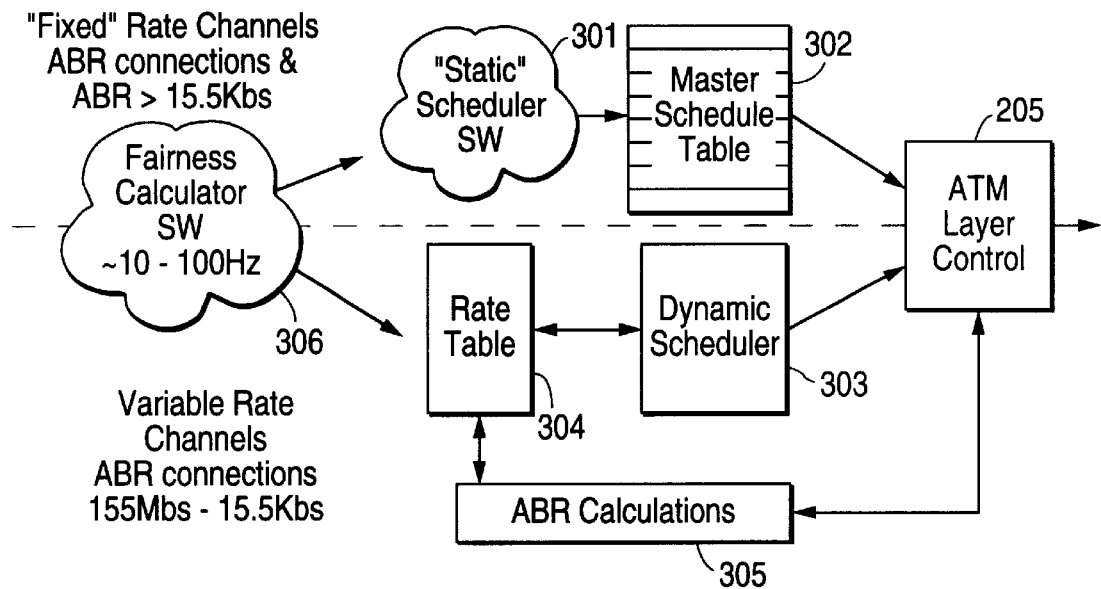
FIG. 3 illustrates the static and dynamic scheduling mechanisms used in SAR 101 for scheduling fixed rate channels and variable rate channels, respectively.

In this embodiment, scheduling is provided by a 2-level scheme, in which a static master scheduler is used for scheduling ATM cell transmissions in fixed rate channels, and a dynamic scheduler is used for scheduling transmissions in the variable rate channels. FIG. 3 illustrates in the split into static and dynamic scheduling mechanisms. As shown in FIG. 3, for fixed rate channels, a static scheduler 301 schedules transmissions for fixed rate channels at regular intervals in a master schedule table 302. Master schedule table 302 is read by ATM layer control module 205 to determine which of the packets (i.e., cells), if any, queued at the fixed rate channels are to be transmitted into ATM network 107. In this embodiment, static scheduler 301 schedules into master schedule table 302 time slots allocated for the transmission of ATM cells from variable rate channels, or transmission of null cells from fixed rate channels. The null cells are used to maintain substantially constant bit rates for fixed rate channels. Such a static scheduler for the fixed rate channels can be implemented, for example, by the static scheduler described in copending U.S. patent application ("Static Scheduler Application"), entitled "SYSTEM AND METHOD FOR TRANSMISSION RATE CONTROL IN A SEGMENTATION AND REASSEMBLY CIRCUIT UNDER ATM PROTOCOL", by Michael J. Miller et al, Ser. No. 08/520,285, filed Aug. 25, 1995, and assigned to Integrated Device Technology, which is also the assignee of the present invention. The disclosure of the above-referenced Static Scheduler Application is hereby incorporated by reference in its entirety.

The variable rate channels are scheduled by a "dynamic scheduler" 303, which schedules the variable rate channels according to their "allowable cell rates" (ACRs). Under the ATM standard, data rates are represented in "cells per second" (cps) by a 16-bit floating point representation, thus spanning a dynamic range from "kilobits per second" to "gigabits per second". While the floating point representation provides a large dynamic range, calculation based on the floating point representation is computationally expensive. In addition, such a floating point-based data rate is difficult to use with a calendar type scheduler, such as static and dynamic schedulers 301 and 303. When using a calendar type scheduler, data rates are more conveniently expressed in number of time slots or intervals between transmissions, each interval representing the time duration necessary for transmission of a single cell. Converting a data rate from "bits per second" (bps) representation to intervals between transmissions is computationally expensive. To minimize computational time, a table look-up technique could be used.

In one table look-up technique, the data rate in intervals is provided by a 16-bit integer which represents the number of intervals between successive cell transmissions. For example, if one cell is transmitted at every interval, i.e., the number of intervals between successive transmissions is one, the top data rate of is achieved. In one implementation, that data rate is 155 Megabits per second (Mbps). If the number of intervals between successive Transmissions is two, i.e., a cell is transmitted every second interval, the data rate drops to 77.5 Mbps. However, one can easily observe that, under that implementation, the possible data rates for high frequencies is "sparse", i.e., the percentage difference in data rate between two data rates represented by small successive integer values of the 16-bit are much larger than between two data rates represented by large successive integer values of the 16-bit integer. For example, in the implementation discussed above, the data rate reduction between transmitting a cell every two intervals result and transmitting a cell every interval is 77.5 Mbps, or 50%. However, the data rate reduction between transmitting a cell every 65535 intervals and transmitting a cell every 65536 intervals is 0.03 bits per second.

To solve the sparse rate density problem, e.g., to achieve a data rate between 155 Mbps and 77.5 Mbps in the above example, while using a calendar type scheduling method, additional bits for fractional precision could be used. For example, an additional 4-bit is provided in the intervals between successive transmissions representation and more complex schedulers can be used. However, under such an approach, while increasing the rate density at the high data rates, further aggravates the rate density at the low data rates, and may result in unduly complex scheduling schemes and an astronomically large data rate table. As discussed below, the present invention provides more desirable data rate densities throughout the dynamic range of the data rates, using a data rate conversion table of reasonable size (e.g. 256 entries).

The allowable cell rate (ACR) for each variable bit rate channel is stored in ACR rate table 304, which is modified by rate control module 305 for each variable rate channel according to traffic conditions, e.g. congestions, in the channel's associated virtual circuit. Dynamic scheduling of variable rate channels are discussed in copending patent application ("Dynamic Scheduler Application"), entitled "METHOD FOR FAIR DYNAMIC SCHEDULING OF AVAILABLE BANDWIDTH RATE (ABR) SERVICE UNDER ASYNCHRONOUS TRANSFER MODE (ATM)", by Michael J. Miller et al., filed on the same day as the present application, attorney docket number M-3887-US, and assigned to Integrated Device Technology, Inc., which is also the Assignee of the present application. The disclosure of the Dynamic Scheduler Application is hereby incorporated by reference in its entirety. As provided in the Dynamic Scheduler Application, dynamic scheduler 303 inherently provides an unweighted fairness scheme which shares the available bandwidth among the variable bit rate channels. However, it is conceivable that an additional fairness scheme can be provided to control the static and dynamic scheduling mechanisms. This additional fairness scheme, represented in FIG. 3 by fairness calculator 306, can be provided, for example, in a software driver for SAR 101. One example of such an additional fairness scheme allocates a local maximum cell rate to each variable rate channel. This local maximum cell rates of all variable channels can be reallocated periodically according to the average local traffic load experienced by SAR 101 in the immediately preceding time period.

Under the ATM standard, when the virtual circuit for an ABR channel is first established, the elements in the virtual circuit negotiate an initial cell rate (ICR), a peak cell rate (PCR) and a minimum cell rate (MCR) upon set-up. Initially, the ICR is the ACR. The values of the PCR and MCR parameters constitute the maximum and the minimum acceptable cell rates during the life time of the virtual circuit. As discussed above, the ACR for each virtual channel is revised periodically by transmitting from the source end-station a resource monitor (RM) cell. The rate determination mechanism using an RM cell is illustrated by FIG. 4.

Figure 4:
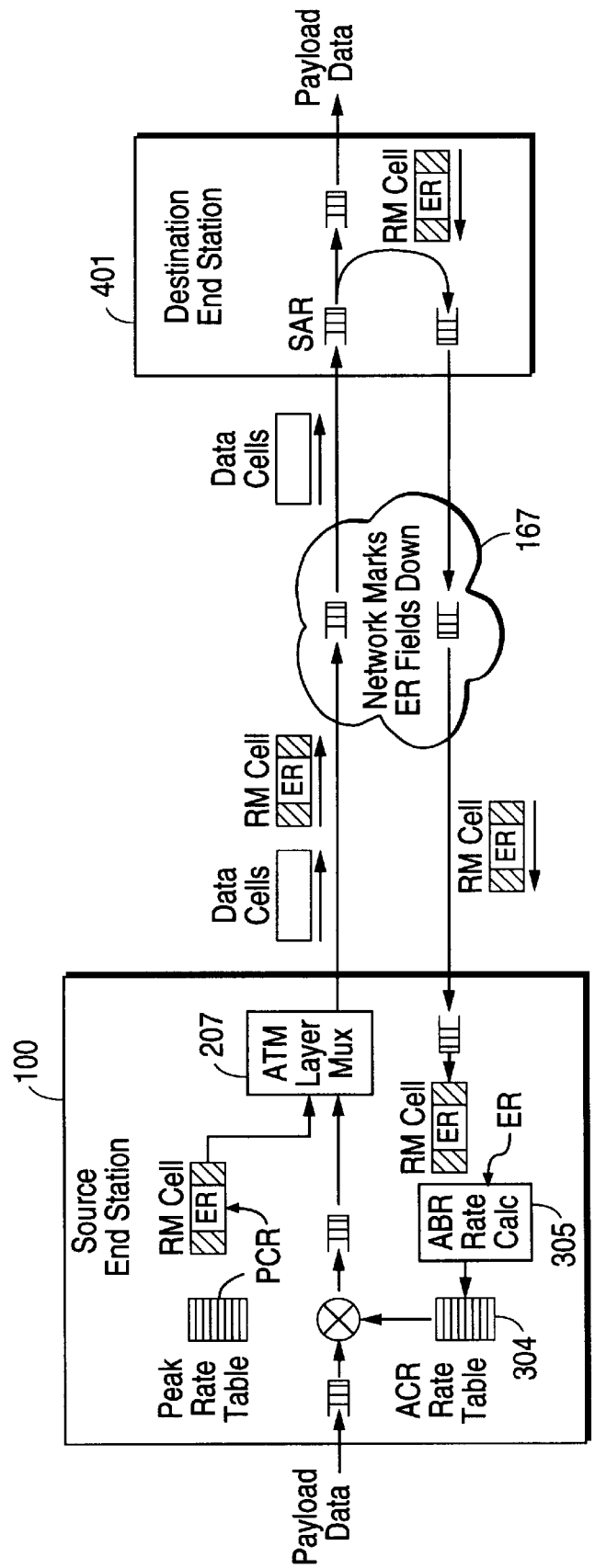
FIG. 4 shows the allowable cell rate determination mechanism used in an embodiment of the present invention.

As shown in FIG. 4, for each variable bit rate channel, source end-station 100 transmits an RM cell periodically (e.g. every 32 data ATM cells) into the variable bit rate channel's associated virtual circuit in ATM network 107. In addition to identification information identifying the variable bit rate channel, an RM cell includes the fields: "direction" (DIR), "congestion indicator" (CI), "no increase" (NI), "explicit cell rate" (ER), "current cell rate" (CCR) and "MCR". Source end-station 100 designates the "DIR" field of the RM cell the value "forward" (i.e. a forward RM (FRM) cell) and provides the values of the "ER", "CCR" and "MCR" fields to be the current ACR, the PCR and MCR values. As mentioned above, PCR and MCR values are negotiated when the virtual circuit is set up. Each element in the virtual circuit of the virtual channel can decrease, but not increase, the value of the ER field of the FRM cell according to the element's local traffic condition. Neither can the element decrease the value of the ER field below the negotiated MCR. If an element is experiencing a congestion condition, or if no increase in the CCR is desired, the element can so indicate by appropriately setting the "CI" and "NI" fields respectively. When destination end-station 401 receives the FRM cell, destination end-station 401 overwrites the "DIR" field of the FRM cell by the value "backward", thereby converting the ATM cell from an FRM cell to a "backward RM" (BRM) cell. Destination end-station 401 can also make appropriate modification to the BRM cell, if necessary, before returning the BRM cell to source end-station 100 via the associated virtual circuit in ATM network 107.

At source end-station 100, rate control module 305 examines the BRM cell received and determines if an increase or decrease in ACR is warranted. If neither the "CI" nor the "NI" field are set, i.e. indicating neither a congestion condition, nor a "no increase" constraint, ACR can be increased. ACR can be increased by a predetermined increment factor (RIF) of the PCR negotiated at virtual circuit creation time, subject to the negotiated ER returned in the BRM cell. The relationship between the new ACR ($ACR_{new}$) and the current ACR ($ACR_{old}$) is given by:

$$ACR_{new} = \min(ER, ACR_{old} + ACR_{old} * RIF)$$

Source end-station 100 can decrease ACR when one or more of the following conditions are met: (i) the "CI" field of the received BRM is set, indicating a congestion condition in one or more elements of the virtual circuit in ATM network 107; (ii) an idle virtual channel condition, or (iii) a condition in which an extreme congestion safeguard is indicated. An idle virtual channel is indicated when CCR is greater than ICR and, at the time the FRM cell is sent, a predetermined threshold time period elapsed since the last RM cell is sent. An extreme congestion safeguard is indicated when multiple FRM cells have been sent, and not returned, since the last BRM cell is received at the source end-station 100. With a congestion condition, ACR can be decreased by a predetermined reduction factor (RDF) of the last ACR, subject to the MCR negotiated at the creation of the virtual circuit. The relationship between $ACR_{new}$ and $ACR_{old}$ under a congestion condition is given by:

$$ACR_{new} = \max(MCR, ACR_{old} - ACR_{old} * RDF)$$

In the case of an idle virtual channel condition, ACR is not decreased below ICR, and $ACR_{new}$ can be calculated as a function of the $ACR_{old}$ and the elapsed time since the last FRM cell ($t_{last\_FRM}$). One relationship between $ACR_{new}$ and $ACR_{old}$ that can be used under the idle virtual channel condition is given by:

$$ACR_{new} = \max(ICR, ACR_{old} - c * ACR_{old} * t_{last\_FRM})$$

where c is a constant.

When extreme congestion safeguard is indicated, ACR can be further decreased by a second predetermined reduction factor (CDF). The relationship between $ACR_{new}'$, i.e. the ACR after adjustment for the idle virtual channel condition, and $ACR_{new}$ under extreme congestion safeguard is given by:

$$ACR'_{new} = ACR_{new} - ACR_{new} * CDF$$

In this embodiment, to minimize the size of ACR rate table 304 and to ensure that any increase or decrease in ACR is a meaningful increase or decrease, i.e. affecting the cell rate of the virtual channel in a reasonably significant manner, increase or decrease of ACR in a virtual channel is taken in logarithmic-linear steps, each representing an increase or decrease in cell rate of a predetermined percentage from the immediately previous rate. An example of the available rates that can be specified in an ACR rate table is reproduced in Table 1 of FIG. 5. Table 1 includes 256 entries and each data rate can be represented by a 20-bit fixed-point number ("20-bit interval representation), including a 15-bit integer and 5 bits of fractional precision. The 20-bit fixed point representation, although not necessary for the present invention, requires cell rate computation operations which are simpler than those involved in the corresponding 16-bit floating point representation. Each allowable cell rate in Table 1 differs from the immediately previous allowable cell rate by approximately 4%. As shown in Table 1, the data rates can be alternatively represented in a interval representation (ACRI), or as a data rate (ACR) in either "bits per second" representation or "cells per second" representation. When a cell rate increase or a cell rate decrease is required, the new current cell rate can be obtained by a single table lookup operation into a rate increase table or a rate decrease table, using the present current allowable cell rate. The allowable cell rates can be represented by reference to the position of the corresponding entry in Table 1 ("8-bit interval representation"). An inverse table can be provided which maps the 16-bit floating point representation into the 8-bit interval representation.

Figure 6:
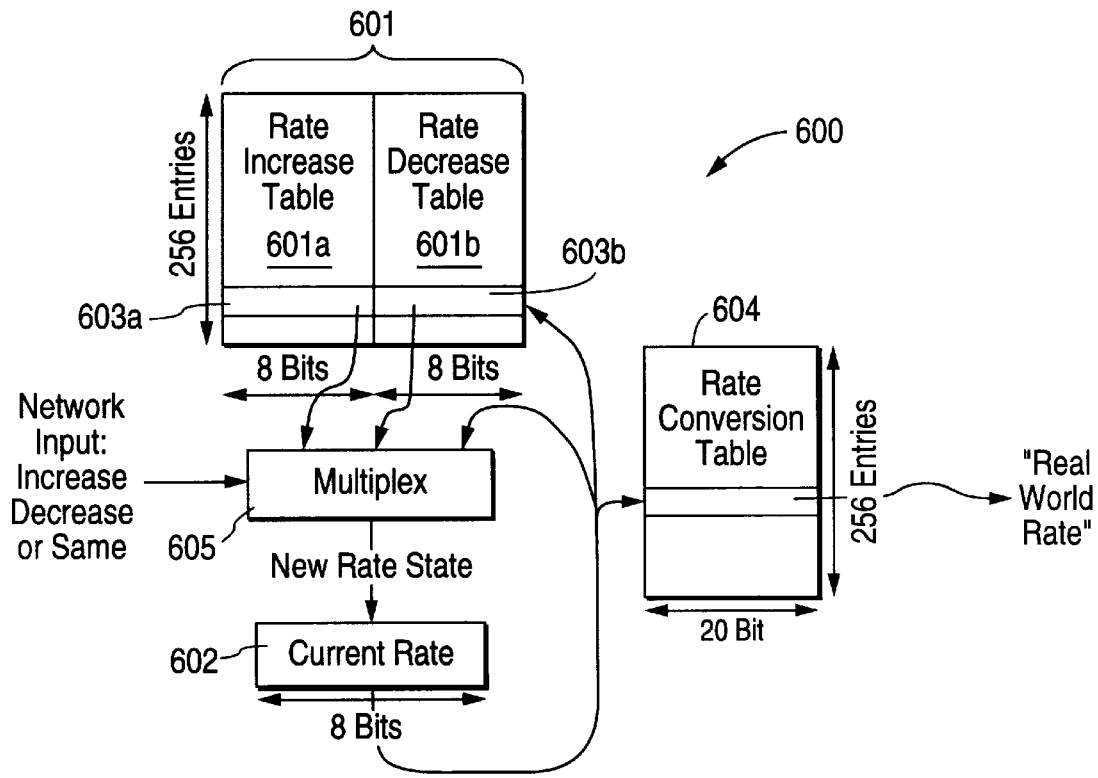
FIG. 6 is a schematic diagram of a next data rate state machine 600 in the embodiment of FIG. 4.

By confining the allowable cell rates to the data rates of the above ACR data rate table, the computation necessary for calculating the next allowable cell rate resulting from an allowable cell rate increase or an allowable cell rate decrease can be achieved by a state machine-based data rate update circuit, using a table lookup method. FIG. 6 is a schematic diagram of such a next data rate state machine 600, in accordance with the present invention.

As shown in FIG. 6, next data rate state machine 600 includes a storage circuit 601, in which a rate increase table (601*a*) and a rate decrease table (601*b*) are stored. Rate increase table 601*a* and rate decrease table 601*b* in storage circuit 601 are each indexed by the current allowable cell rate, provided in the 8-bit interval representation ("LACRI"). In FIG. 6, the current allowable cell rate is held in a register 602. As discussed above, the current allowable cell rate is used to index into both rate increase table 601*a* and rate decrease table 601*b*. The tables provide two 8-bit allowable cell rate values, being respectively the next increased allowable cell rate and the next decreased allowable cell rate. A multiplexer 605 selects the allowable cell rate from the next increased allowable cell rate, the next decreased allowable cell rate, and the current cell rate, according to the values of the NI field and the CI field of the most recently returned BRM cell, as discussed above. The selected next allowable cell rate can be provided in the 20-bit interval representation, by looking up a rate conversion table in storage circuit 604. Alternatively, the data rate can also be mapped from the 8-bit interval representation into the 16-bit floating point of the ATM standard. The next allowable cell rate becomes the current allowable cell rate when loaded into register 602.

Figure 7:
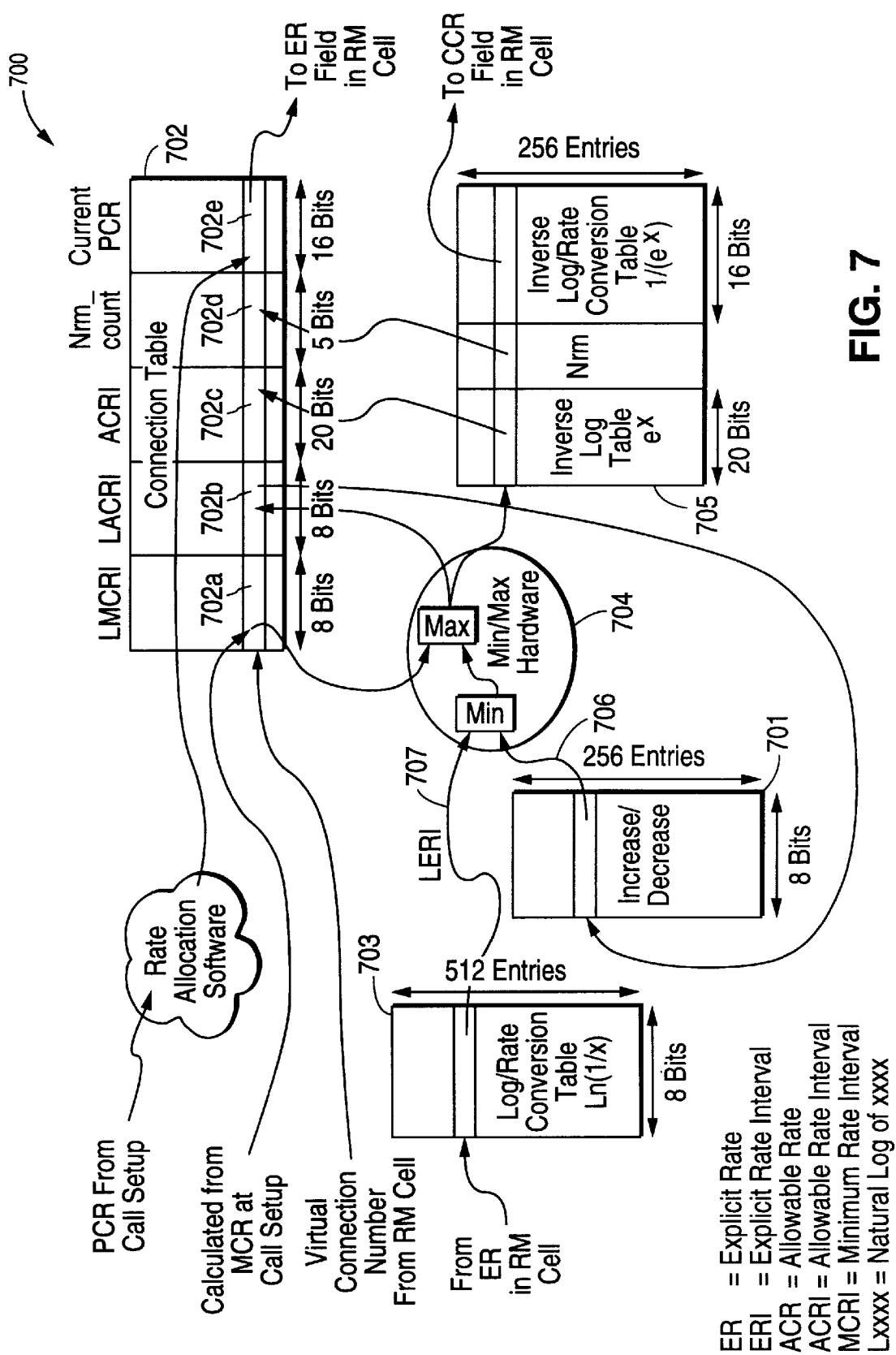
FIG. 7 shows a cell rate update circuit 700 which can be used in the embodiment of FIG. 4.

Using a next cell rate state machine, such as state machine 600 of FIG. 6, the allowable cell rate of a virtual circuit can be updated by the cell rate update circuit 700 of FIG. 7. FIG. 7 shows an update circuit 700 for periodically updating the allowable cell rate which can be used in conjunction with the embodiment of the present invention shown in FIG. 4. As shown in FIG. 7, a connection table is stored in a storage circuit 701. The connection table in storage circuit 701 includes a record for each active virtual connection. Each connection table record, indexed by the virtual connection number, includes the fields: (i) an 8-bit field 702*a* (LMCRI), which is the 8-bit interval representation of the minimum cell rate (MCR) negotiated when the virtual connection is set up; (ii) the current allowable cell rate field 702*b* in 8-bit interval representation (i.e., LACRI), (iii) the culrent allowable cell rate field 702c in 20-bit interval representation (i.e., ACRI), (iv) a 5-bit counter 702d for data cells (i.e., NRM cells) remained to be transmitted since transmitting the last RM cell, and (v) the current peak cell rate (PCR) field 702e, negotiated when the virtual connection is set up.

Periodically, an RM cell of the virtual connection is transmitted as an FRM cell initialized with the explicit rate (ER) field initialized to the value in PCR field 702e. When the RM cell is received as a BRM cell from the virtual connection, the value of the ER field is mapped to its 8-bit interval representation by a table look-up operation at storage element 703, which includes a table for mapping the 16-bit floating point data rate into a corresponding "LERI" value 707 in the internal 8-bit interval representation. At the same time, next cell rate state machine 701, which can be implemented by the state machine 600 of FIG. 6, provides the next allowable cell rate 706. Logic circuit 704 first selects the lesser of the "LERI" value 707 and next allowable cell rate 706 The greater of this selected value is then and the minimum cell rate (LMCRI) value 702a from the connection table is then provided as the current interval cell rate (LACRI). This current interval cell rate is mapped in storage circuit 705 by a table look-up process into a 20-bit interval representation (ACRI). The ACRI and LACRI current cell rates are stored into the LACRI and ACRI fields in the corresponding entries 702b and 702c of the connection table of storage circuit 702. In addition, the number of NRM cells to be transmitted before the next RM cell is written into data cell counter 702d in the corresponding entry of the connection table. The LACRI current cell rate is mapped into the 16-bit floating point representation in storage circuit 705 for use in the CCR field of the next RM cell. Upon initialization, the peak cell rate (PCR) is provided in the ER field.of the next RM cell.

Although not shown in FIG. 7, further cell rate adjustments under additional traffic conditions, e.g., the virtual idle channel, or the second rate reduction factor (CDF) discussed above, can be achieved by including additional circuits in logic circuit 704, or in the driver program.

The above detailed description is provided to illustrate the exemplary embodiments herein and is not intended to be limiting. Numerous modifications and variations within the scope of the present invention are possible. The present invention is defined by the following appended claims.

We claim:

1. An apparatus for deriving a next data packet transmission rate in a packetized data network, comprising a circuit selecting said next data packet transmission rate from a plurality of data packet transmission rates in accordance with an input data packet transmission rate and control signals indicating whether said next data packet transmission rate is to be (i) greater than said input data packet transmission rate, (ii) the same as said input data packet transmission rate, or (iii) less than said input data packet transmission rate and provides in response to said control signals said next data packet transmission rate, said plurality of data packet transmission rates representing an ordered list of data packet transmission rates, wherein the ratio between two successive elements of said ordered list is substantially constant.

2. An apparatus as in claim 1, said circuit comprises:

a storage element containing a data structure embodying said ordered list accessible by said input data packet transmission rate to provide a first output value greater than said input data packet transmission rate and a second output value less than said input data packet transmission rate; and a selection circuit, receiving said control signals, for selecting said next data packet transmission rate from said first and second output values and said input data packet transmission rate, in accordance with said control signals.

3. An apparatus as in claim 2, wherein said control signals are set in accordance with a maximum bit rate negotiated periodically among devices of said data network.

4. An apparatus as in claim 1, further comprising a selection circuit for limiting said next data packet transmission rate to between a maximum transmission rate and a minimum transmission rate.

5. An apparatus as in claim 1, wherein said apparatus is included in a segmentation and reassembly circuit complying with asynchronous transfer mode (ATM), said next data packet transmission rate being the next cell transmission rate for a variable bit rate service.

6. An apparatus as in claim 5, further comprising a calendar type scheduler circuit for scheduling transmission data packets for (i) said variable bit rate data service, in accordance with said next data packet transmission rate, and (ii) a fixed bit rate data service.

7. An apparatus as in claim 1, wherein the number of elements in said ordered list of data packet transmission rates is a power of 2.

8. An apparatus as in claim 1, further comprising a calendar type scheduler circuit for scheduling transmissions of data packets in accordance with said next data packet transmission rate.

9. A method for deriving a next data packet transmission rate in a packetized data network, comprising the steps of:

receiving an input data packet transmission rate; and selecting said next data packet transmission rate from a plurality of data packet transmission rates in accordance with said input data packet transmission rate and control signals indicating whether said next data packet transmission rate is to be (i) greater than said input data packet transmission rate, (ii) the same as said input data packet transmission rate, or (iii) less than said input data packet transmission rate, said plurality of data packet transmission rates representing an ordered list of data packet transmission rates, wherein the ratio between two successive elements of said ordered list is substantially constant.

10. A method as in claim 9, wherein said step of selecting comprises the steps of:

providing in a storage element a data structure embodying said ordered list accessible by said input data packet transmission rate, said storage element providing a first output value greater than said input data packet transmission rate and a second output value less than said input data packet transmission rate; and in accordance with said control signals, selecting said next data packet transmission rate from said first and second output values and said input data packet transmission rate.

11. A method as in claim 10, wherein said control signals are set in accordance with a maximum bit rate negotiated periodically among devices of said data network.

12. A method as in claim 9, further comprising the step of limiting said next data packet transmission rate to between a maximum transmission rate and a minimum transmission rate.

13. A method as in claim 9, wherein said method is provided in a segmentation and reassembly circuit complying with asynchronous transfer mode (ATM), said next data packet transmission rate being the next cell transmission rate for a variable bit rate service.

14. A method as in claim 13, further comprising the step of scheduling, in a calendar type scheduler circuit, transmission data packets for (i) said variable bit rate data service, in accordance with said next data packet transmission rate, and (ii) a fixed bit rate data service.

15. A method as in claim 9, wherein the number of elements in said ordered list of data packet transmission rates is a power of 2.

16. A method as in claim 9, further comprising the step of scheduling, in a calendar type scheduler, transmissions of data packets in accordance with said next data packet transmission rate.

* * * * *